United States Patent [19]

Masood et al.

[11] Patent Number: 5,237,552
[45] Date of Patent: Aug. 17, 1993

[54] SECTOR MARK DETECTION IN LONG BURN PATTERN FOR OPTICAL DATA DISKS

[75] Inventors: Shakeel Masood; George Li, both of Sunnyvale, Calif.

[73] Assignee: Advanced Micro Devices, Inc., Sunnyvale, Calif.

[21] Appl. No.: 810,574

[22] Filed: Dec. 24, 1991

Related U.S. Application Data

[63] Continuation of Ser. No. 807,465, Dec. 16, 1991, abandoned.

[51] Int. Cl.⁵ ............................................. G11B 7/00
[52] U.S. Cl. ................................... 369/54; 369/48; 369/59; 360/49
[58] Field of Search ............... 369/59, 48, 47, 124, 369/58, 54; 360/48, 51, 77.08, 72.2, 49

[56] References Cited

U.S. PATENT DOCUMENTS

| | | | |
|---|---|---|---|
| 4,646,281 | 2/1987 | Verboom | 369/59 |
| 4,746,997 | 5/1988 | Shrinkle et al. | 360/48 X |
| 4,774,700 | 9/1988 | Satoh et al. | 369/58 X |
| 4,949,200 | 8/1990 | Weng | 360/77.2 |

*Primary Examiner*—Andrew L. Sniezek
*Assistant Examiner*—Nabil Hindi
*Attorney, Agent, or Firm*—Lowe, Price, LeBlanc & Becker

[57] ABSTRACT

The sector mark SM within a long burn data pattern recorded in each sector of an optical disk is detected asynchronously using a robust pattern detection algorithm. The terminal portion of the data pattern at the VFO field of the ANSI X3B11/ISO CCS Standard is ignored. The corner bits at the ends of the remaining pattern and between strings of one and zero bits are ignored, and the pattern that remains is stored in a register. A decoder compares adjacent strings of one and zero bits stored in the register to corresponding predetermined data. Voting circuitry uses a threshold value programmed by the user to determine the presence of a sector mark in the data pattern.

12 Claims, 5 Drawing Sheets

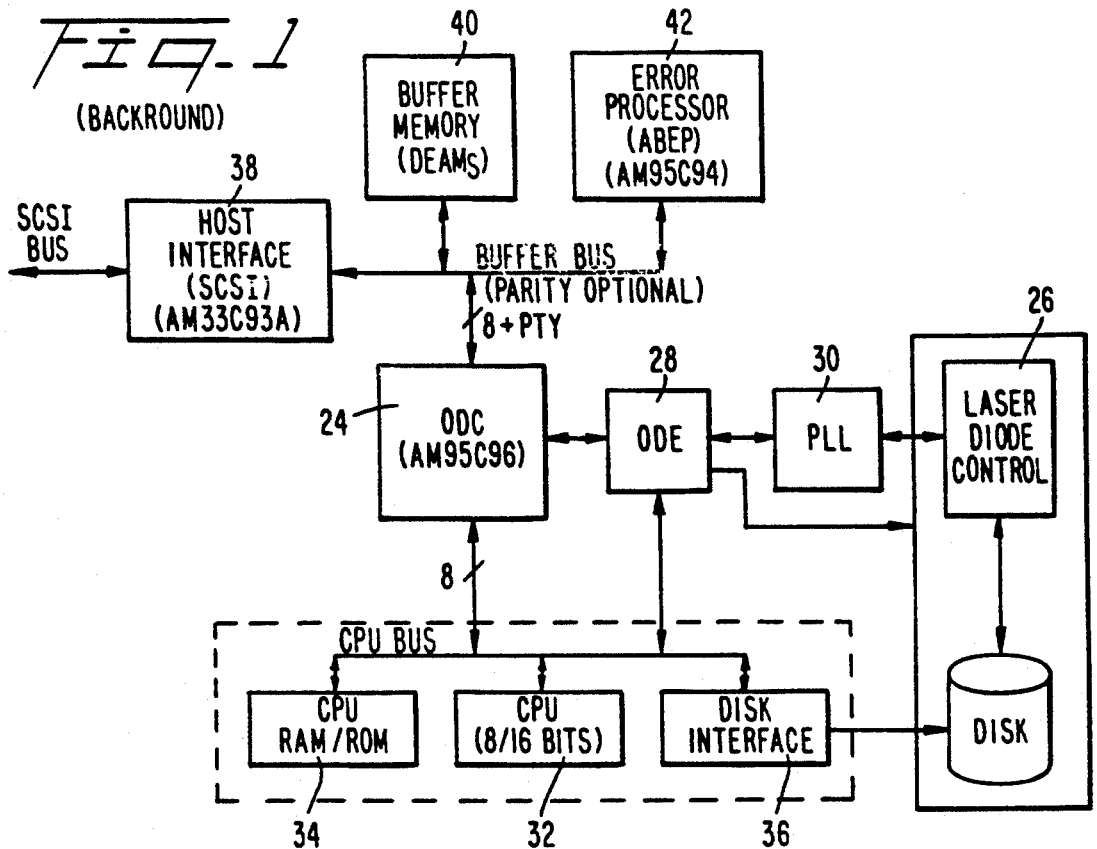
Fig. 1 (BACKGROUND)
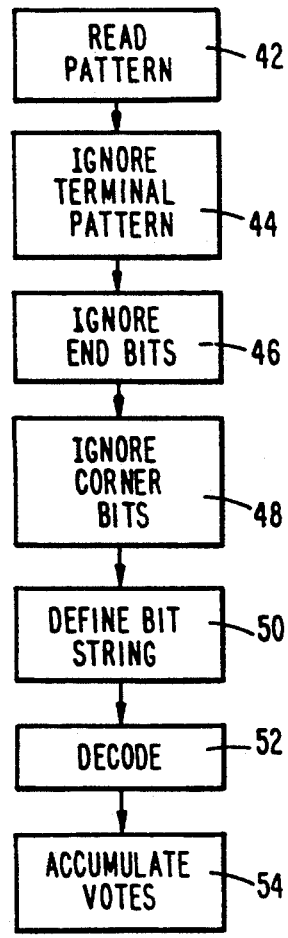
Fig. 3

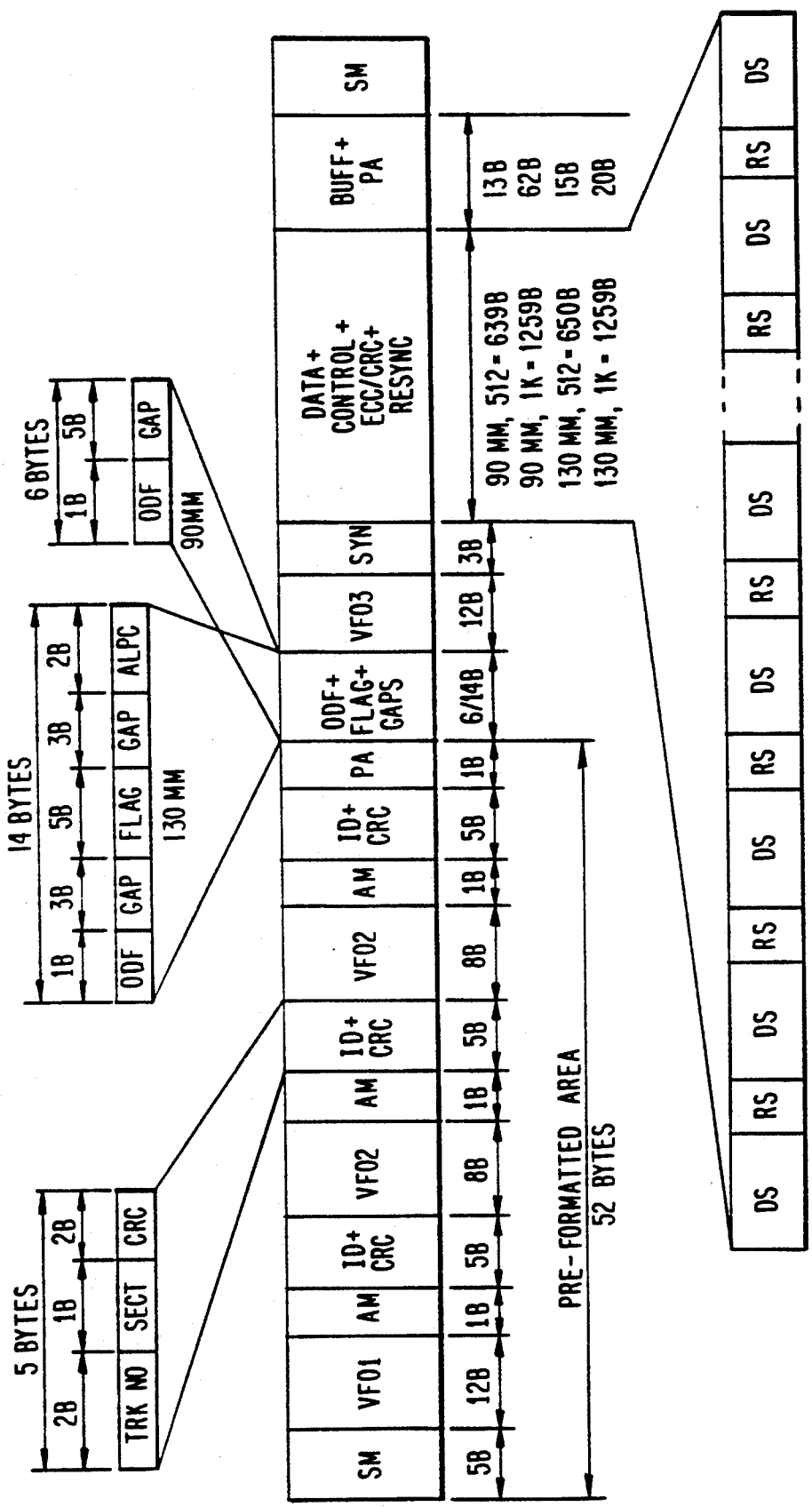
FIG. 2 (BACKGROUND)

80-BIT SECTOR MARK PATTERN
```
     5        3   3        7       3   3   3  3  3   7
1111111111100000011111100000000000000011111100010111111110010010
```

70-BIT LONG BURN AREA
```
1111111110000000111111000000000000000011111100000011111111111111
```

68-BIT SHIFT REGISTER 67                                                              0
`1 11111111100000001111110000000000000001111110000001111111111111 1`

*Fig. 4*

BITS TO BE COMPARED

| 67 60 | 57 54 | 51 48 | 45  34 | 31 28 | 25 22 | 19 16 | 13 10 | 7  0 |
|-------|-------|-------|--------|-------|-------|-------|-------|------|
|`11111111` 10 | `0000` 01 | `1111` 10 | `000000000000` 01 | `1111` 10 | `0000` 01 | `1111` 10 | `0000` 01 | `11111111` |

→ VOTE 1   → VOTE 2   → VOTE 3   → VOTE 4   → VOTE 5

*Fig. 5*

(BACKGROUND)

(BACKGROUND)

SECTOR MARK DETECTION IN LONG BURN PATTERN FOR OPTICAL DATA DISKS

This application is a continuation of application Ser. No. 07/807,465 filed Dec. 16, 1991 now abandoned.

TECHNICAL FIELD

This invention is related generally to detection of data prerecorded on optical data disks, and more particularly, to asynchronous detection of the sector mark (SM) embedded in long burn data within the preformatted area of a track sector.

BACKGROUND ART

Optical disk media are capable of storing a considerable amount of data in the form of small marks or holes in the surface of the disk, each representing a bit of data. The marks, burned into the surface of the disk by a laser, are arranged along spiral tracks, each divided into a number of sectors.

FIG. 8 is a diagram of an apparatus 10 for reading data prerecorded on an optical disk 12. The disk 12 is rotated by a disk servo 14 comprising a precisely controllable DC motor. A laser 16 irradiates the surface of the disk 12, and light reflected from the disk impinges on the surface of a detector 18. An optical head 20, located between the disk 12 and laser/detector 16, 18, is positioned by another servo (not shown) to read data from a desired track. Writing is carried out using similar optics, with the optical medium being preheated to enable light from laser 16 to form surface marks corresponding to data. The servos and laser/detector are controlled by a microprocessor-based controller 22.

The apparatus 10 shown in FIG. 8 typically is located within a common housing, such as provided by SCSI (Small Computer System Interface) resident at a personal computer or other computer requiring storage of a large quantity of data. The data storage capacity both sides of a disk such as a 130 mm (5¼ inch) optical disk.

Data read and write logic, implemented by microprocessor-based controller 22 in the representative illustration of FIG. 8, has been carried out by commercially available special function integrated circuits, such as the AM95C96 optical disk controller (ODC), manufactured by Advanced Micro Devices of Sunnyvale, Calif. A system implementing the AM95C96, as shown in FIG. 1, comprises ODC 24 reading data through an encoder/decoder (ODE) 28 and a phase locked loop (PLL) 30 off the optical disk and writing to the optical disk. A CPU 32 controls seeking to the desired location on the disk. The ODC/ODE 24, 28 interfaces with CPU 32, working memory 34 and a disk interface 36 to process the applied data signals and transfer commands for compliance with particular specifications such as the X3B11 continuous composite servo (CCS), WORM/-ERASABLE optical format developed by ANSI.

The ODC 24 is interfaced to a system bus by host interface unit 38, and is supported by buffer memory 40 and error processor 42. General operation of the system shown in FIG. 1, being known to the prior art, is for brevity not described in detail.

FIG. 7 depicts the layout of tracks on an optical disk. The tracks are arranged along a spiral path on the surface of the disk 12, wherein each turn of the spiral is treated as a separate track. In one example, the optical disk may be 90 mm in diameter, and may contain 10,000 tracks (numbered 0–9999 in FIG. 7); each track is divided into twenty-five (25) sectors. Each sector in turn will carry 725 bytes of unformatted data. The optical disk in this example thus is capable of storing 181,250,000 bytes of data, equivalent to about 100,000 pages of text. Modifications include implementing more densely packed sectors, larger diameter disks and/or double-sided storage for enhanced information storage capacity.

FIG. 2 is a diagram of the X3B11 format, comprising a header area that is "pre-stamped", followed by a data area for receiving data for storage. The first field of the header is a sector mark (SM), having a special redundant pattern. This field identifies the start of the sectors. The SM field as well as the other fields constituting the X3B11 format is summarized in Table I below.

TABLE I

| NAME | FUNCTION | PATTERN |
|---|---|---|
| SM | Sector Mark | 80 channel bits (5 bytes) Special Redundant Pattern = 5 3 3 7 3 3 3 3 5 long burn followed by 0010010010 = 11111111110000001111110000000000000001111110000001111110000001111111111 0010010010 |
| VFO1,2,3 | Lock up field for PLL | Continuous Pattern<br>VFO1 = 01001001001 . . . 010010<br>VFO2' = 10010010010 . . . 010010<br>VFO2" = 00010010010 . . . 010010<br>VFO3 = 01001001001 . . . 010010 |
| | Note: VFO2 varies depending on previous pattern in CRC. | |
| AM | Address Mark (Bit/Byte Sync) 16 Channel bits, (1 byte) | 0100 1000 0000 0100 |
| ID | Track No. (2 bytes) Sector No. (1 bytes) | High order/Low order<br>bits 7–6 = ID Number (ID 0-2)<br>bit 5 = 0 Reserved<br>bits 4–0 = Sector Number |
| CRC | ID Field Check Bytes (2 butes) | CRC Polynomial seed = 1's |
| PA | Postamble (one byte) | Allows last CRC and Data byte closure under RLL (2,7) modulation |
| ODF | Offset Detection Flag (one byte) | Not written, no grooves |
| GAP | Gap (Splice) | Unformatted area |
| FLAG | Indicate Written Block | Continuous Pulse (5 byte area, decision by majority) 100100100100100100100100 . . . |
| ALPC | Auto Laser Power Control | Blank 2 bytes zone |
| SYNC | Redundant Sync for Data | Triple sync pattern 0100 0010 0100 0010 0010 0010 0100 0100 1000 0010 0100 1000 |
| DATA | User Data, Control, CRC, ECC and RESYNC bytes. | See FIGS. 1.6 and 1.7. |

TABLE I-continued

| NAME | FUNCTION | PATTERN |
| --- | --- | --- |
| BUFFER | Used for RPM timing margins | Not Written area |
| RESYNC | Data Field byte sync 16 Channel bits (1 byte) | 0010 0000 0010 0100 |

NOTE: All bit patterns show channel code bits in RLL (2,7) modulation.

During both reading and writing operations, ODE 26 detects sector mark (SM) once within each sector. Referring to Table I, the sector mark comprises 80 bits arranged as a long burn followed by a transition pattern. It is necessary to detect the sector mark dynamically during reading and writing in order to identify the start of each sector. This requires robust decoding of the long burn pattern.

Sector mark decoding may be carried out by monitoring strings of ones in the long burn pattern. This approach is not robust, however, because it will tend not to respond to sector mark patterns that deviate only slightly from the specified pattern. This is troublesome, as all bits of the sector mark pattern often will not be detectable as a result of imperfections in the optical medium, etc. The present invention is an improved sector mark detection algorithm that is more robust, i.e., it can identify a sector mark pattern that is valid only in some portions of the long burn pattern and not in others.

DISCLOSURE OF THE INVENTION

The invention is an improved sector mark pattern detection method and apparatus for asynchronously detecting a sector mark within a track of an optical data disk. The algorithm upon which the method and apparatus of this invention robust.

In accordance with one aspect of the invention, the long burn pattern, prerecorded on the disk, is optically detected, and transitions between strings of 1 bits and 0 bits forming the pattern are identified. The "corner bits", constituting the first 1 bit and first 0 bit of each transition, are ignored, and adjacent strings of 1 bits and 0 bits are paired. Each pair of adjacent strings of 1 bits and 0 bits is compared with corresponding predetermined bits to establish a vote. The number of votes is evaluated to detect the presence of a sector mark within the optically detected pattern. Preferably, the number of votes required for detecting a sector mark is preselectable by the user. This enables the degree of robustness of the detection algorithm, and, hence, of the method and apparatus, to be made to conform to particular user requirements.

In accordance with a preferred embodiment, the terminal portion of the long burn pattern, constituting a transition to the VFO1 field within X3B11 specification, is ignored. The first and last bits, together with preselected corner bits, of the remaining pattern are ignored. A decoder in the form of a number of comparators compares strings of 1 bits and 0 bits adjacent the corner bits with predetermined patterns of bits. The result of each comparison is supplied to voting logic circuitry.

In the embodiment described, the sector mark preferably comprises 80 bits (5 bytes, wherein 16 bits of data constitute each byte). The bits that remain after ignoring the terminal bits, the first bit, last bit and corner bits of the long burn pattern, comprise 68. The decoder compares five adjacent strings of 1 and 0 bits, and the voting logic has a threshold that is programmable by the user as 3/5 or 4/5 to identify a sector mark.

BRIEF DESCRIPTION OF DRAWINGS

FIG. 1 is a block diagram of an optical disk controller including an ODE unit of a type to which the sector mark detection algorithm of the present invention may be applied.

FIG. 2 is a diagram showing X3B11 data format utilized in the preferred embodiment.

FIG. 3 is a simplified flow chart depicting the sequence of steps for implementing the inventive sector mark detection algorithm.

FIG. 4 shows truncation of terminal bits from the long burn pattern for storage in a register.

FIG. 5 shows stripping of corner bits from the pattern, stored in the register of FIG. 4, to be applied to voting logic.

BEST MODE FOR CARRYING OUT THE INVENTION

Referring to FIGS. 3 and 4, the sequence of steps for carrying out sector mark detection, in accordance with this invention, is summarized. Data which may or may not include the 80 bit sector mark pattern specified by X3B11 is first read from the surface of the optical disk as depicted in FIG. 3 (step 42). The last ten bits of the X3B11 format sector mark pattern, shown in FIG. 4, which comprise bits not characteristic to the sector mark pattern for transition to the VF01 field, are ignored. This preferably will be carried out by software (step 44).

Figure 9:
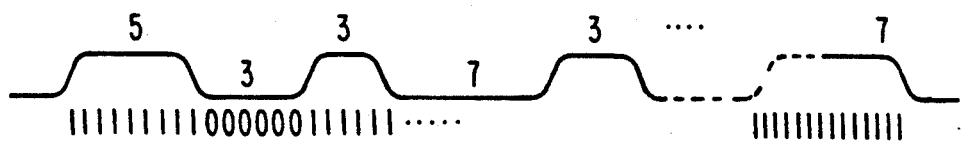
FIG. 9 is a diagram of a waveform characterizing a sector mark pattern in accordance with X3B11 specifications.
Figure 7:
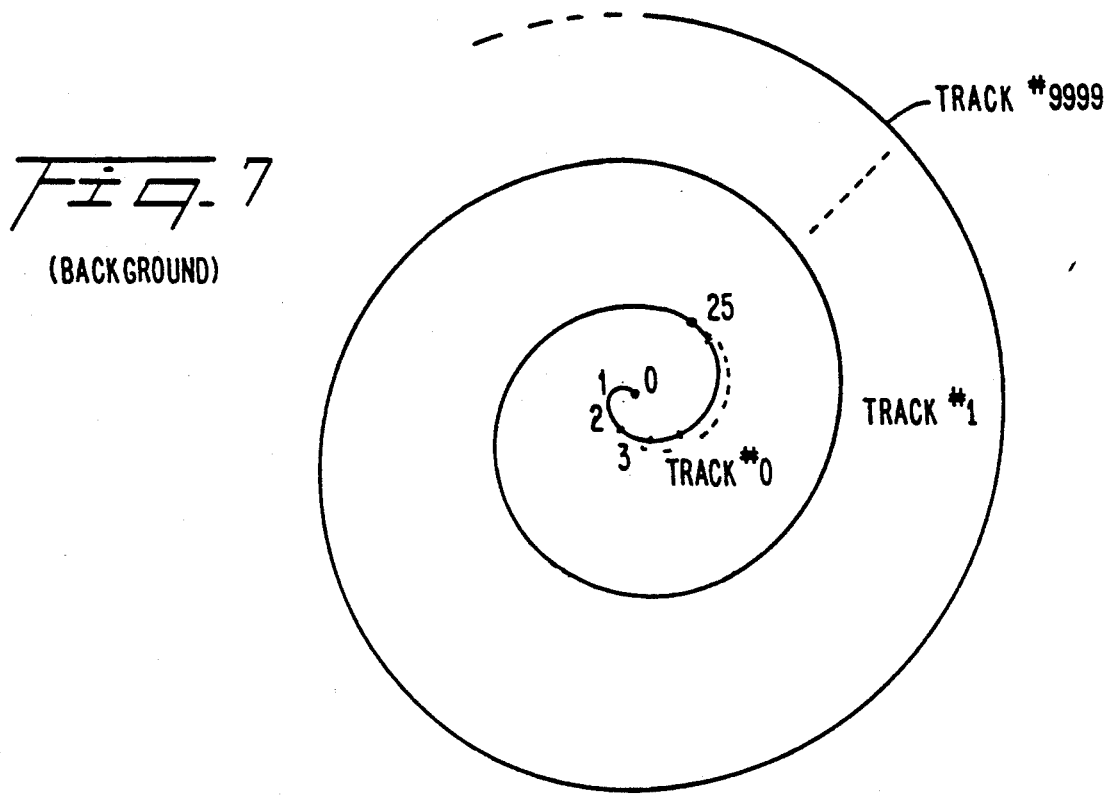
FIG. 7 is a diagram showing field format of an optical data disk.
Figure 8:
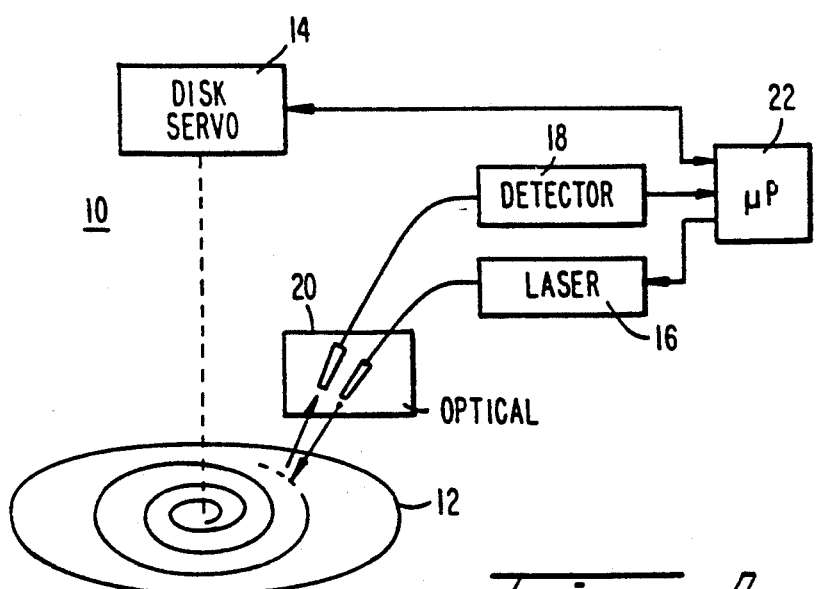
FIG. 8 is a simplified diagram of an optical disk read/write system.

The long burn area at this point in the sequence of steps comprises 70 bits. The end bits of the pattern, that is, the first and last bits, are next ignored in step 46. These bits are unnecessary, because since detection of the sector mark pattern is asynchronous, the leading and trailing edges of the first and last bits, forming amplitude transitions in the long burn pattern, cannot reliably be detected as symbolized in FIG. 9. The resultant 68 bit pattern shown in FIG. 4 is stored in a register.

The corner bits, i.e., the first and last bits of each string of 1 bits and 0 bits of the pattern, are ignored, as shown in FIG. 5 and specified by step 48. The corner bits are unnecessary, as like the end bits of the pattern, they are not able to be asynchronously detected reliably.

Figure 5A:
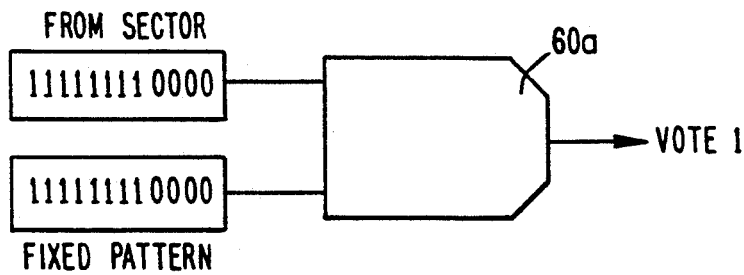
FIG. 5a is a diagram of a comparator circuit for implementing decoding.

Adjacent strings of 1 bits and 0 bits are "paired" in step 50, and decoded by comparing the two strings with predetermined data (step 52). That is, a first comparison will compare bits 54-57, 60-67 with the fixed pattern 111111110000, as shown in FIG. 5a. If there is a match, a first vote is indicated. Simultaneously, bits 22-25, 28-31 will be compared with the bits 00001111, and if there is a match, another vote is generated. The final vote compares bits 0-7 with data 11111111; there is no pairing since bits 0-7 are residual bits. This technique suggests sampling the entire pattern every bit time, i.e., a "snapshot" approach.

The number of votes accumulated in step 54 is counted and compared to a voting threshold that is programmable by the user.

In accordance with the preferred embodiment, the voting logic threshold is programmable so that 3/5 or 4/5 votes, selectively, are considered sufficient to indicate a detection of a sector mark in the long burn pattern. As a matter of practice, the user may initially select a 4/5 majority as the voting threshold. If no sector mark is found during scanning of a long burn pattern of an optical disk, the user will reduce the voting threshold to a 3/5 majority. In this example, the higher threshold may have been found to be too selective as a result of defects in the recorded bit pattern, whereas the lower threshold may reliably detect a sector mark pattern obfuscated somewhat by surface defects.

Figure 6:
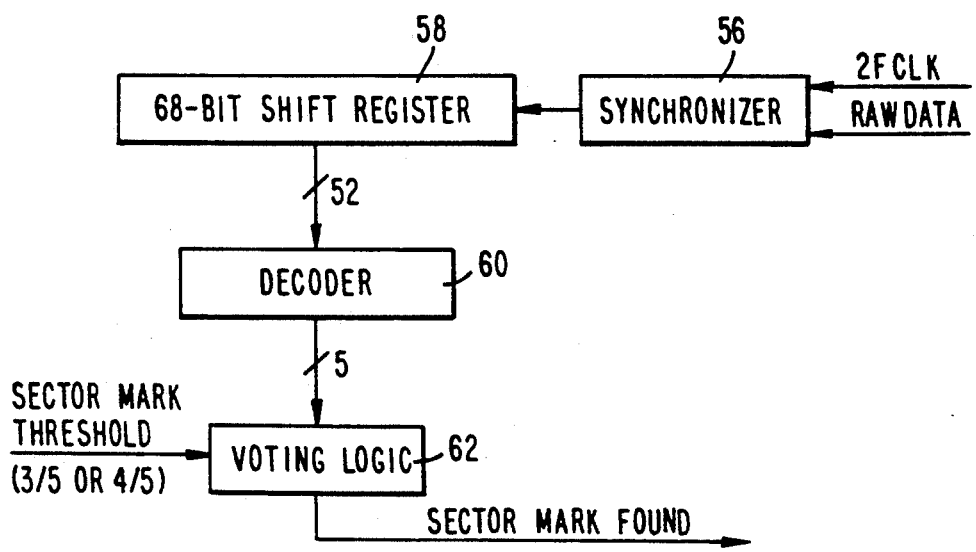
FIG. 6 is a simplified block diagram of circuitry for implementing the algorithm.

FIG. 6 depicts circuitry for implementing the algorithm of FIG. 3. The circuitry may be implemented by the conventional system of FIG. 1 but preferably is integrated within an IODC of a type described in co-pending application Ser. No. 07/813,275, filed concurrently herewith and incorporated herein by reference. The IODC, in essence, carries out the functions of ODC 24 and ODE 28 of FIG. 1. The raw data read from the optical disk, being asynchronous, is synchronized by a synchronizer 56 to a 2FCLK clock signal and is supplied to a 68 bit shift register 58. However, sector mark detection is carried out in parallel at every bit time by decoder 60, preferably implemented by a plurality of comparators 60a of a type shown in FIG. 5a, together with conventional voting logic circuitry 62. The voting logic circuitry 62, which is conventional, implemented preferably by hard-wired logic circuitry but alternatively by programmable array logic or software, is programmable by applying to it a sector mark threshold signal, selected by the user.

This invention accordingly detects the sector mark pattern embedded within a long burn data pattern in a track of an optical data disk. The algorithm, implemented by the invention, uses variable threshold voting circuitry to program robustness of detection of the desired pattern.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein. For example, although functions for carrying out sector mark detection are described as being in the form of hardware elements in the preferred embodiment, software implementation is possible as well.

What is claimed:

1. A method of asynchronously detecting a sector mark within a track of an optical disk, wherein said sector mark is characterized by a predefined pattern of alternating strings of one bits and zero bits, comprising the steps of:
   detecting transitions between said strings of one bits and zero bits forming said pattern;
   ignoring the corner bits of the pattern at each transition detected in the preceding step;
   pairing adjacent strings of one bits and zero bits;
   comparing each pair of adjacent strings of one bits and zero bits with a corresponding predetermined pattern of bits to establish a vote; and
   evaluating the number of votes obtained in the preceding step to detect a sector mark.

2. The method of claim 1, wherein the number of votes required for detecting a sector mark is preselectable.

3. The method of claim 1, including the step of ignoring bits from a terminal portion of said pattern.

4. The method of claim 1, including the step of further ignoring the first and last bits of said pattern.

5. The method of claim 1, wherein said pattern comprises an eighty-bit sector mark pattern.

6. A method of asynchronously detecting a sector mark within a track of an optical disk, wherein said sector mark is characterized by a predefined pattern of alternating series of strings of one and zero bits, comprising the steps of:
   preconditioning said pattern of bits by detecting transitions between said strings of one bits and zero bits forming said pattern, and ignoring from said pattern the corner bits at each said transition;
   storing said pattern of bits, preconditioned in the preceding step, in a register;
   comparing each pair of adjacent strings of one bits and zero bits stored in said register with a corresponding predetermined pattern of bits to establish a vote; and
   evaluating the number of votes obtained in the preceding step to detect a sector mark.

7. The method of claim 6, wherein said step of evaluating includes predefining a threshold number of votes constituting a detection of a sector mark.

8. Apparatus for asynchronously detecting a sector mark having a predefined pattern of bits from among bits read from a track of an optical disk, comprising:
   a shift register;
   means for receiving said bits read from said optical disk track, ignoring corner bits at transitions between adjacent series of one bits and zero bits and storing remaining bits in said shift register;
   comparator means for comparing adjacent strings of one bits and zero bits stored in said shift register with corresponding bit patterns, and, in response, providing particular output signals; and
   voting logic circuitry for supplying a sector mark found signal in accordance with said output signals obtained from said comparator means.

9. The apparatus of claim 8, wherein said voting logic circuitry is programmable to supply said sector mark signal in response to a preselected number of matches detected by said comparator means.

10. The apparatus of claim 8, wherein said means for receiving ignores a terminal portion of said pattern read from said optical disk track.

11. The apparatus of claim 8, wherein said pattern read from said optical disk is an 80-bit pattern, and said register comprises 68 stages.

12. The apparatus of claim 9, wherein said particular output signals comprise five signals, and said voting logic circuitry is programmable as 3/5 or 4/5 matches.

* * * * *